US010780841B2

(12) United States Patent
Shaeff et al.

(10) Patent No.: US 10,780,841 B2
(45) Date of Patent: Sep. 22, 2020

(54) DEMOUNTABLE CAMERA MODULE FOR A VEHICLE

(71) Applicant: Ford Global Technologies, LLC, Dearborn, MI (US)

(72) Inventors: Nathan Kenneth Shaeff, West Bloomfield, MI (US); David R. Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 16/129,952

(22) Filed: Sep. 13, 2018

(65) Prior Publication Data
US 2020/0086807 A1    Mar. 19, 2020

(51) Int. Cl.
*B60R 11/04* (2006.01)
*H04N 5/225* (2006.01)
*B60R 11/00* (2006.01)

(52) U.S. Cl.
CPC ........... *B60R 11/04* (2013.01); *H04N 5/2257* (2013.01); *B60R 2011/0084* (2013.01); *B60R 2300/808* (2013.01); *B60R 2300/8066* (2013.01)

(58) Field of Classification Search
None
See application file for complete search history.

(56) References Cited

U.S. PATENT DOCUMENTS

| 7,195,267 B1 | 3/2007 | Thompson | |
|---|---|---|---|
| 2002/0003571 A1* | 1/2002 | Schofield | B60R 11/0235 348/148 |
| 2003/0133014 A1* | 7/2003 | Mendoza | B60R 1/00 348/148 |
| 2005/0201047 A1* | 9/2005 | Krah | G06F 1/1616 361/679.55 |
| 2006/0098094 A1 | 5/2006 | Lott | |
| 2006/0103727 A1* | 5/2006 | Tseng | B60R 1/00 348/148 |

(Continued)

FOREIGN PATENT DOCUMENTS

| CN | 202243248 | 5/2012 |
|---|---|---|
| KR | 20120053113 | 5/2012 |

OTHER PUBLICATIONS

Ebay, Pearl RearVision Wireless Car Backup Camera and Obstacle Alert System, Dual HD Reverse Camera for Car or Truck, retrieved from https://www.ebay.in/itm/PearlRearVisionWirelessCarBackup CameraandObstacleAlertSystemDualHDR/192502970393 on Aug. 2, 2018.

*Primary Examiner* — Kate H Luo
(74) *Attorney, Agent, or Firm* — David Kelley, Esq.; Carlson, Gaskey & Olds, P.C.

(57) ABSTRACT

A vehicle assembly includes, among other things, a camera module that is moveable back and forth between a first and a second position. In the first position, the camera module is mounted to, and at least partially housed within, a portion of a vehicle. In the second position, the camera module is mounted to a structure other than the vehicle. A viewing method includes using a camera module to view a first area when the camera module is at least partially housed within a portion of a vehicle in a first position. The method further includes using the camera module to view a different, second area after moving the camera module to a second position where the camera module is mounted to a structure other than the vehicle.

8 Claims, 4 Drawing Sheets

(56) References Cited

U.S. PATENT DOCUMENTS

| | | | |
|---|---|---|---|
| 2009/0122141 A1* | 5/2009 | Nakamura | B60R 11/04 |
| | | | 348/148 |
| 2012/0133768 A1* | 5/2012 | Stephan | B60R 1/00 |
| | | | 348/148 |
| 2013/0120110 A1* | 5/2013 | Kalous | G07C 9/00571 |
| | | | 340/5.54 |
| 2015/0008300 A1* | 1/2015 | Jagoda | B60R 11/04 |
| | | | 248/309.1 |
| 2015/0172518 A1* | 6/2015 | Lucas | H04N 5/2258 |
| | | | 348/148 |
| 2015/0232027 A1* | 8/2015 | Freitas | B60Q 9/008 |
| | | | 340/435 |
| 2016/0318456 A1* | 11/2016 | Moenig | B60R 11/04 |
| 2017/0057423 A1* | 3/2017 | Wang | H04N 5/2254 |
| 2017/0129419 A1* | 5/2017 | Conger | H04N 5/2252 |
| 2017/0225628 A1 | 8/2017 | Aich et al. | |
| 2017/0297540 A1* | 10/2017 | Zhang | B60S 1/566 |
| 2017/0324897 A1* | 11/2017 | Swaminathan | B64C 39/024 |
| 2018/0030759 A1* | 2/2018 | Chanbonpin | E05B 63/0052 |
| 2018/0134260 A1* | 5/2018 | Ahrens | B60S 5/06 |
| 2018/0186377 A1* | 7/2018 | Bramson | B60L 58/12 |
| 2018/0276431 A1* | 9/2018 | Sequeira | G08B 13/2462 |
| 2019/0337466 A1* | 11/2019 | Oba | H04N 5/2252 |

* cited by examiner

US 10,780,841 B2

DEMOUNTABLE CAMERA MODULE FOR A VEHICLE

TECHNICAL FIELD

This disclosure relates generally to a camera module that can be selectively mounted to a vehicle or another structure.

BACKGROUND

Many vehicles include cameras. Images captured by the cameras can be viewed on, for example, a display within a passenger compartment of the vehicle. The images can show areas around the vehicle that may be difficult for a user to otherwise see.

Objects can obstruct the images captured by the camera. For example, a trailer towed by the vehicle can obstruct images captured by a rearview camera. When an image is obstructed, the user viewing the image may find it difficult to get a good understanding of the areas around the vehicle.

SUMMARY

A vehicle assembly according to an exemplary aspect of the present disclosure includes, among other things, a camera module that is moveable back and forth between a first and a second position. In the first position, the camera module is mounted to, and at least partially housed within, a portion of a vehicle. In the second position, the camera module is mounted to a structure other than the vehicle.

In a further non-limiting embodiment of the foregoing assembly, the portion of the vehicle is a tailgate, and the structure other than the vehicle is a trailer.

A further non-limiting embodiment of any of the foregoing assemblies includes a magnet of the camera module. The magnet is configured to mount the camera module to the structure when the camera module is in the second position.

A further non-limiting embodiment of any of the foregoing assemblies includes a latch configured to selectively lock the camera module in the first position.

A further non-limiting embodiment of any of the foregoing assemblies includes a mechanical actuator that is actuated to transition the latch to a position that permits movement of the camera module from the first position.

A further non-limiting embodiment of any of the foregoing assemblies includes a button that is actuated to cause an actuator to transition the latch to a position that permits movement of the camera module from the first position.

A further non-limiting embodiment of any of the foregoing assemblies includes a vehicle badge that moves with the camera module between the first and the second position.

A further non-limiting embodiment of any of the foregoing assemblies includes a connector, a battery, and a transmitter of the camera module. The connector is configured to couple to a power source of the vehicle when the camera module is mounted in the first position such that the power source can charge the battery. The battery is configured to power a transmitter when the camera module is in the second position.

In a further non-limiting embodiment of any of the foregoing assemblies, the transmitter is configured to transmit data captured by a camera of the camera module to a display that can be viewed by a user.

In a further non-limiting embodiment of any of the foregoing assemblies, the display is within the vehicle.

A viewing method according to another exemplary aspect of the present disclosure includes using a camera module to view a first area when the camera module is at least partially housed within a portion of a vehicle in a first position. The method further includes using the camera module to view a different, second area after moving the camera module to a second position where the camera module is mounted to a structure other than the vehicle.

In a further non-limiting embodiment of the foregoing method, the portion of the vehicle is a tailgate and the structure other than the vehicle is a trailer.

A further non-limiting embodiment of any of the foregoing methods includes viewing the first area and the second area on a display.

A further non-limiting embodiment of any of the foregoing methods includes wirelessly communicating between the vehicle and the camera module when the camera module is in the second position.

A further non-limiting embodiment of any of the foregoing methods includes transmitting an alert when the camera module is moved from the vehicle a distance that is more than a threshold distance.

A further non-limiting embodiment of any of the foregoing methods includes charging a battery of the camera module when the camera module is in the first position, and powering the camera module using the battery when the camera module is in the second position.

In a further non-limiting embodiment of any of the foregoing methods, the charging is an inductive charging.

A further non-limiting embodiment of any of the foregoing methods includes locking the camera module in the first position, and authorizing an unlocking prior to permitting the unlocking.

A further non-limiting embodiment of any of the foregoing methods includes opening at least one door of the camera module when moving the camera module to the first position. The opening permitting a connector of the vehicle to engage a connector of the camera module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a camera module for a vehicle. The camera module can be mounted to a vehicle and used to capture images of a first area. The camera module can be demounted from the vehicle and mounted to another structure to capture images from a different, second area. A user can view images captured by the camera module on a display.

Figure 1:
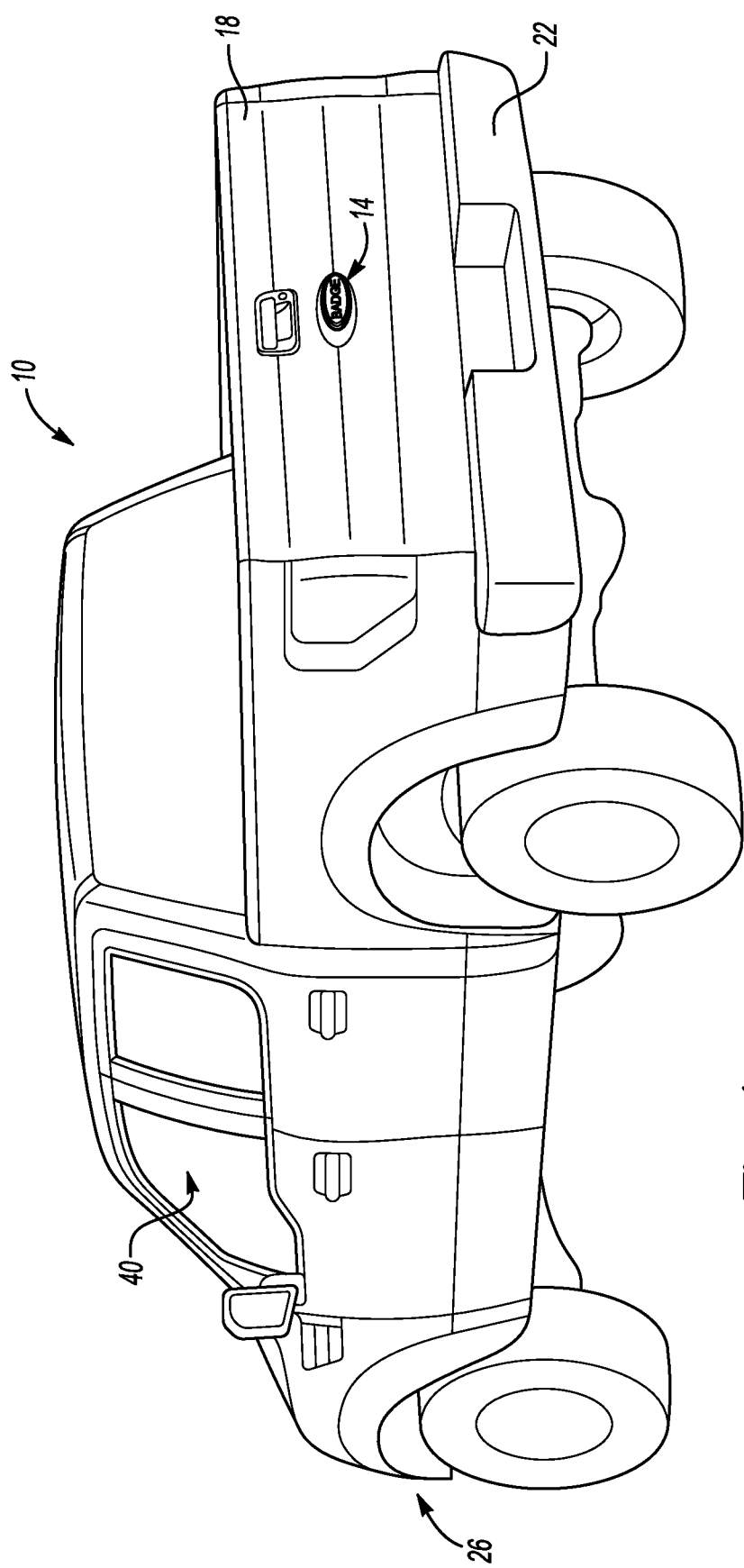
FIG. 1 illustrates an example vehicle incorporating a camera module.

With reference to FIG. 1, an assembly of a vehicle 10 includes a camera module 14 that is mounted to, and at least partially housed within, a portion of the vehicle 10. In this example, the portion of the vehicle 10 is a moveable panel of the vehicle 10 and, more specifically, a tailgate 18 of the vehicle 10. The moveable panel could instead be a liftgate or door of the vehicle. In still other examples, the camera module 14 could be mounted to, and at least partially housed within, a fixed structure of the vehicle 10, such as within a rear bumper 22, or along a front portion 26 of the vehicle 10.

For purposes of this disclosure, moveable panels of the vehicle 10 are panels that can be moved and articulated while the other portions of the vehicle 10 remain stationary. The movement could be rotation about a hinge, and rotation relative to fixed structures of the vehicle 10. The fixed structures are portions of the vehicle 10 that are not intended to move when the vehicle 10 is moving, or parked and stationary.

Figure 2:
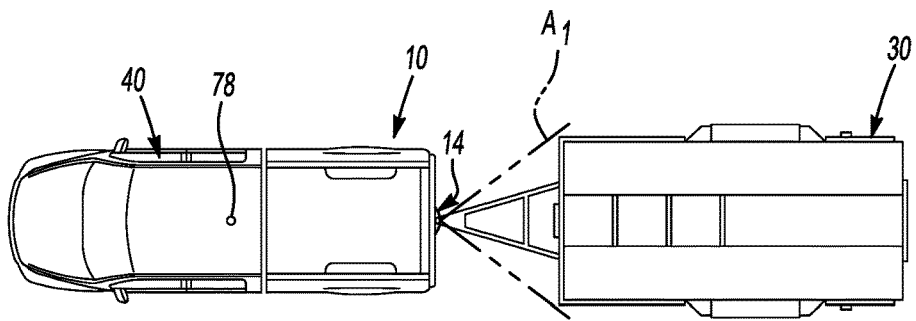
FIG. 2 illustrates an overhead view of the vehicle of FIG. 1 pulling a trailer.

As shown in FIG. 2, the vehicle 10 can tow a trailer 30. The trailer 30, for purposes of this disclosure, refers to a vehicle towable by the vehicle 10. The trailer 30 could be a boat trailer, a towable RV, or another structure towed by the vehicle 10.

Figure 3:
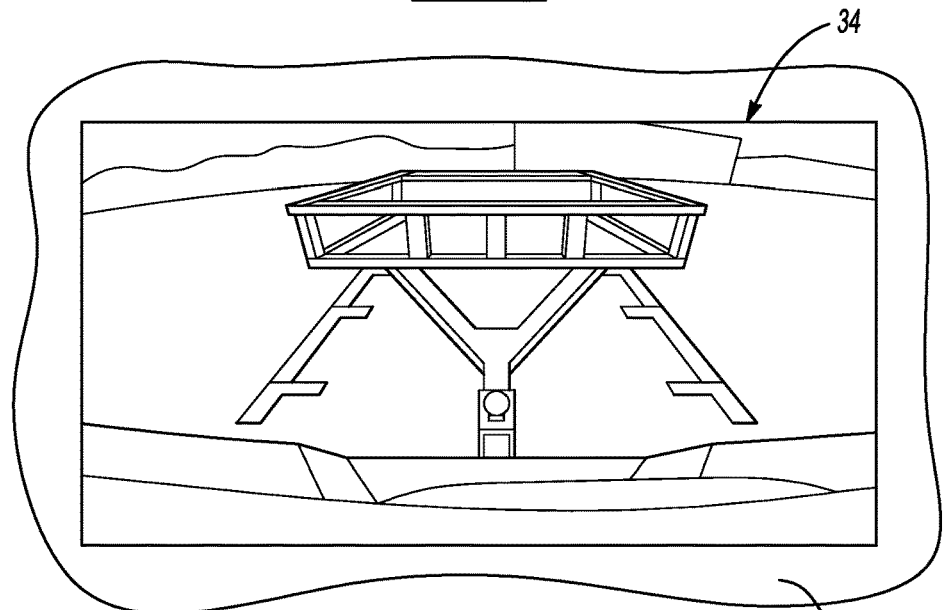
FIG. 3 illustrates an image captured by a camera of the camera module in the position of FIG. 1 when the vehicle is pulling the trailer of FIG. 2.

With reference now to FIG. 3 and continuing reference to FIGS. 1 and 2, components of the camera module 14 can capture an image 34 that is viewed by a user on a display 38. The display 38 can be within a passenger compartment 40 of the vehicle 10. In another example, the image from the camera module 14 could be provided on a display located elsewhere, such as on a display associated with a personal handheld device of the user like a smartphone.

When the camera module 14 is mounted to the vehicle 10 as shown in FIG. 1, the camera module 14 is in a first position. When in the first position, the image captured by the camera module 14 corresponds to a first area $A_1$, which is aft the vehicle 10.

When the camera module 14 is mounted to the vehicle 10 in the position of FIG. 1 and the vehicle 10 is towing the trailer 30, the trailer 30 can obstruct the image 34. The user cannot view the image 34 and easily see the areas behind the trailer 30 which may, among other things, complicate backing up the trailer 30 with the vehicle 10.

Figure 4:
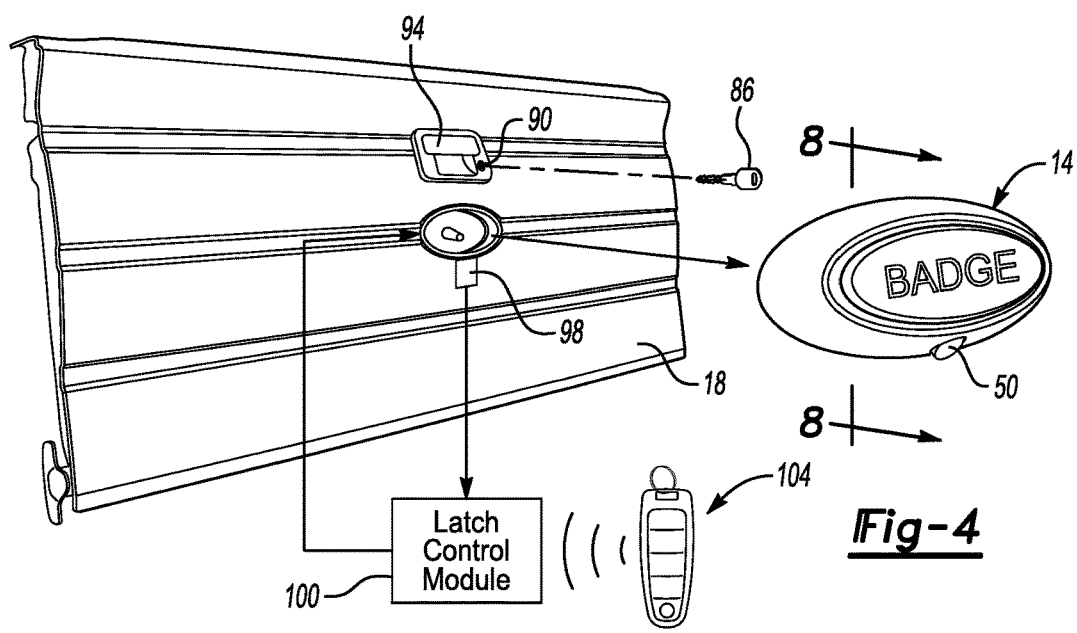
FIG. 4 illustrates the camera module demounted from the vehicle of FIG. 1.
Figure 5:
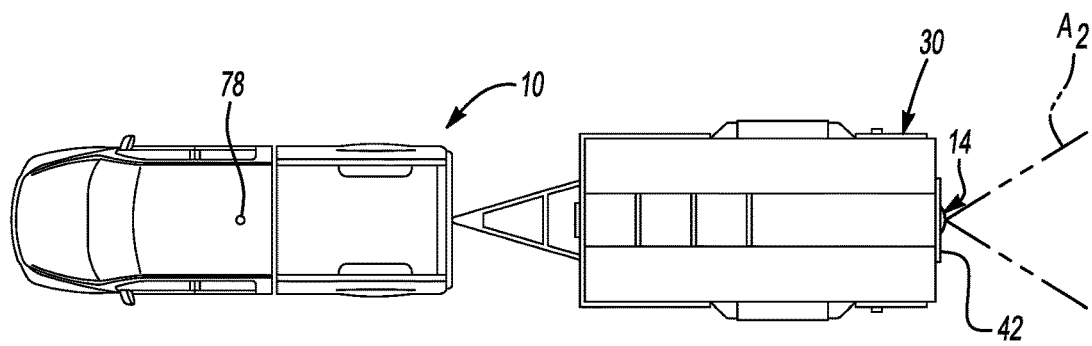
FIG. 5 illustrates a camera module mounted to the trailer of FIG. 2.
Figure 6:
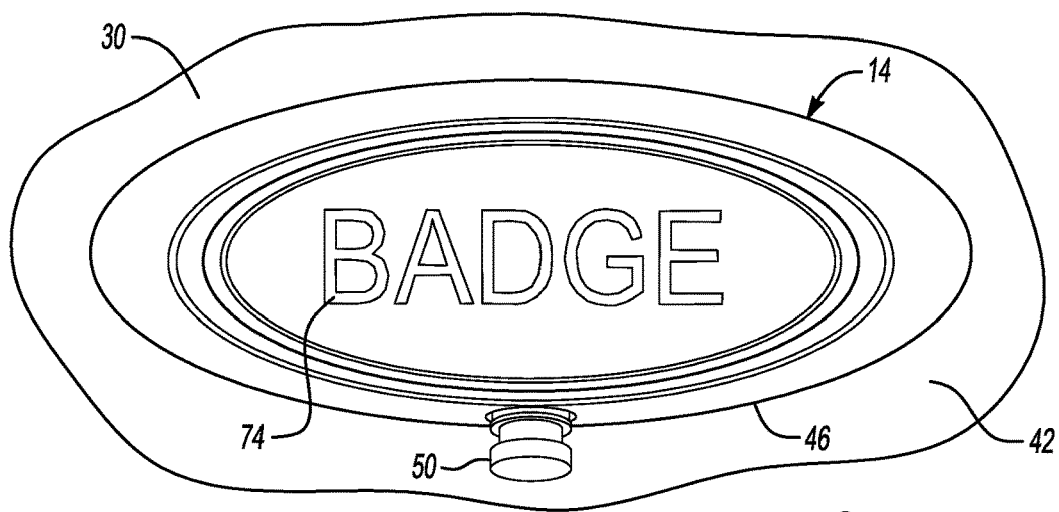
FIG. 6 illustrates a close-up view of the camera module mounted to the trailer in FIG. 5.

To provide a more beneficial image on the display 38, the camera module 14 can be demounted from the tailgate 18 as shown in FIG. 4 and repositioned on a surface 42 of the trailer 30 as shown in FIGS. 5 and 6. When mounted to the surface 42 of the trailer 30, the camera module 14 is in a second, different position. When in the second position, the camera module 14 can capture images from a second area $A_2$, which is aft the trailer 30. The camera module 14 can be placed on the surface 42 to provide a desired viewing angle and area.

The surface 42 is a rear surface of the trailer 30 and thus a type of structure that is separate from the vehicle 10. The camera module 14 could mount to other structures separate from the vehicle 10 in other examples.

Figure 7:
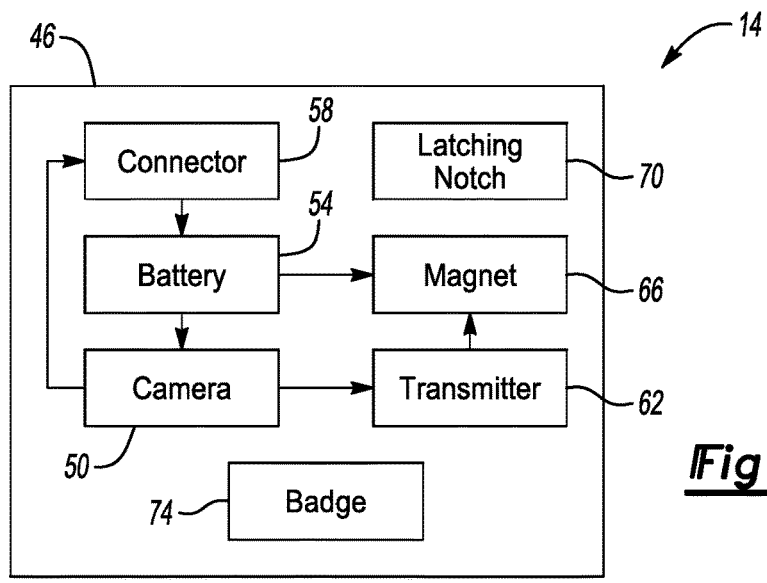
FIG. 7 illustrates a schematic view of the camera module of FIG. 1.

With reference to FIGS. 1, 5, and 7, the camera module 14 includes, in the exemplary non-limiting embodiment, a housing 46, a camera 50, a battery 54, a connector 58, a transmitter 62, a magnet 66, a latch notch 70, and a badge 74.

The camera 50 capture the images that are provided to the user on the display. When the camera module 14 is mounted to the vehicle 10, images captured by the camera 50 can be transmitted from the camera module 14 to the vehicle 10 via a wired connection. When the camera module 14 is attached to the surface 42 of the trailer 30, the transmitter 62 can be used to wirelessly transmit the images captured by the camera 50 to a receiver 78 of the vehicle 10.

The camera 50, the transmitter 62, or both, can be powered by electrical energy stored within the battery 54 of the camera module 14. Electrical energy from the battery 54 may be required to initiate the transmissions from the transmitter 62.

In some examples, the transmitter 62 may be a transceiver capable of receiving communications from the vehicle 10 or from another source. The communications may include commands for particular images from the camera 50. The camera module 14, in such an example, could include a camera module controller that responds to the commands by making adjustments to the camera 50. Exemplary adjustments could include widening or narrowing a field of view.

The magnet 66 is an electromagnet, in this example. Electric current from the battery 54 can pass through a portion of the magnet 66 to generate a magnetic field that holds the camera module 14 against the surface 42. The magnetic field can be strong enough to mount the camera module 14 to the surface 42 as the trailer 30 is towed by the vehicle 10 during ordinary operation, but weak enough to permit a user to remove the camera module 14 from the surface 42 when desired.

In another example, the user can control the magnetic field. The user could, for example, actuate a button within the vehicle 10, or on another device, that sends a command to the transmitter 62. In response to the command, the camera module controller can reduce electrical energy flowing from the battery 54 to the magnet 66. The reduction in electrical energy weakens the magnetic field enough for the user to pry the camera module 14 from the surface 42.

In some examples, the magnets 66 could be rare earth magnets selected and sized to produce a desired magnetic field.

Figure 8:
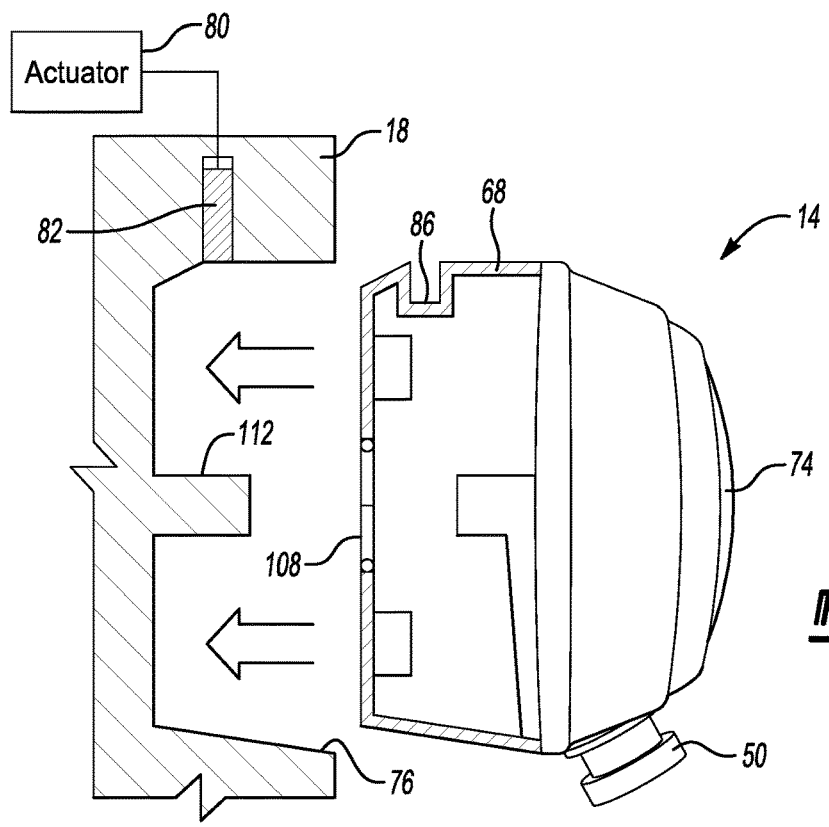
FIG. 8 illustrates a section view taken at line 8-8 in FIG. 4 when the camera module is demounted from the vehicle and moving to a position where the camera module is mounted to the vehicle.
Figure 9:
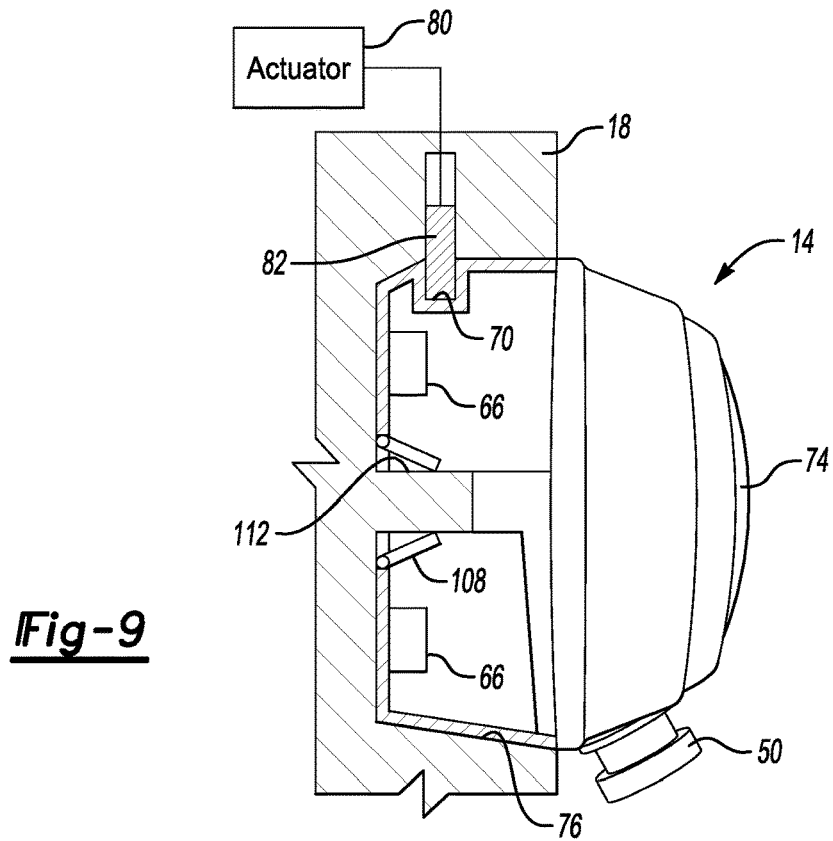
FIG. 9 illustrates the section of FIG. 8 when the camera module is mounted to the vehicle.

Referring now to FIGS. 7-9, when the camera module 14 is mounted to the tailgate 18, the latch notch 70 can be engaged to mount the camera module 14 to the tailgate 18. When mounted, a portion of the camera module 14 is received within a cavity 76 of the tailgate 18. Receiving some of the camera module 14 within the tailgate 18, or another are of the vehicle 10, can conceal areas of the camera module 14 from view, which can be aesthetically pleasing. Further, receiving some of the camera module 14 within an area of the vehicle 10 like the tailgate 18 can facilitate proper positioning of the camera module 14. Also, receiving a portion of the camera module 14 within the tailgate 18 or another area of the vehicle 10 can help to prevent damage to the camera module 14.

The tailgate 18 can include an actuator 80 that transitions a latch pin 82 into a latched position where a portion of the latch pin 82 is held within the latch notch 70 of the housing 46. The latch pin 82 positioned within the latch notch 70 mounts the camera module 14 to the tailgate 18. In another example, the latch pin 82 could be incorporated into the camera module 14 and the latch notch 70 provided by the tailgate 18. The latch notch 70 and latch pin 82 together provide portions of a latch mechanism.

The actuator 80, in some examples, is mechanical actuator that moves the latch pin 82 in response to mechanical control. For example, the actuator 80 could mechanically transition the latch pin 82 from the latched position to an unlatched position in response to a user inserting and rotating a key 86 within a key cylinder 90 (FIG. 4). The rotation of the key 86 moves linkages that cause the latch pin 82 to transition between the latched position and the unlatched position. In this example, the key cylinder 90 is located within the tailgate 18 near a handle 94 of the tailgate.

In another example, the latch pin 82 could transition from the latched position to an unlatched position in response to an electronic command. For example, a button 98 disposed on the tailgate 18 could be actuated by the user to generate a signal that causes the actuator 80 to transition the latch pin 82 from the latched position to the unlatched position, or vice versa. The signal could be received by a latch control module 100. In response to the signal, the latch control module 100 can command the actuator 80 to move the latch pin 82 from the latched position to the unlatched position, or vice versa.

The button 98 could be the same button that is used to control other functions of the vehicle 10. For example, if a user can control the opening and closing of a moveable panel of the vehicle 10 with a button, that same button could be used to command the latching mechanism that holds camera module 14 to unlatch. The user quickly pressing and releasing the button 98 could cause the tailgate 18 to lower. The user pressing and holding the button 98 could cause the latch pin 82 to move from the latched position so that the camera module 14 can be demounted. The tailgate 18 could stay in the closed position when the user presses and holds the button 98.

In some examples, the latch control module 100 ensures that the transition is authorized prior to permitting the transition. For example, the latch control module 100 may require an authorized key fob 104 to be within a certain range prior to commanding the actuator 80 to transition the latch pin 82. This authorization step can prevent the camera module 14 from being unlatched by an unauthorized user.

Another mechanism for preventing unauthorized removal could include the latch control module 100 transmitting an alert if the camera module 14 is moved more than a threshold distance, say 20 feet, away from the vehicle 10. The alert could be a chirp of the horn, a sounding of a vehicle alarm, a message transmitted to the user's smartphone, or some combination of these. The alert feature can help to address concerns with an unauthorized removal of the camera module 14 from the tailgate 18 or the surface 42 of the trailer 30. The transmitter 62 of the camera module 14 may continually send signals to the vehicle 10 to verify that the camera module 14 is within the threshold distance from the vehicle 10.

As shown in FIGS. 8 and 9, the housing 46 can include at least one access door 108. As the camera module 14 is moved into the cavity 76, a connector 112 of the tailgate 18 presses against the at least one access door 108. This pivots the at least one access door 108 and permits the connector 112 to move at least partially within an interior of the housing 46 to engage the connector 58 of the camera module 14. When the camera module 14 is mounted to the tailgate 18, the connector 58 is coupled to the connector 112. When the camera module 14 is not mounted to the tailgate 18, the at least one access door 108 can automatically close to protect the interior of the housing 46 from debris, such as dust, and moisture. The at least one access door 108 is spring biased to the closed position in some examples.

Image data from the camera 50 can communicate from the camera module 14 through the connectors 58 and 112 to the vehicle 10. Electrical energy from a power source of the vehicle 10 can flow through the connectors 112 and 58 to the camera module 14 to charge the battery 54. The power source could be an accessory battery. Commands can communicate between the camera module 14 and the vehicle 10 through the connectors 58 and 112.

In another example, the battery 54 of the camera module 14 could be inductively charged by a power source of the vehicle when mounted to the vehicle 10 instead of being charged though the connectors 58 and 112. The camera module 14 could, for example, include spacing for inductive charging contacts that interface with corresponding inductive charging contacts within the tailgate 18.

In the exemplary embodiment, the camera module 14 includes the badge 74. Other examples could omit the badge 74. The badge 74 is an emblem or identifier that can designate a make, model, manufacturer, or some combination of these. The badge 74 on the camera module 14 can ensure that the emblem or identifier remains visible to an operator of a vehicle following the vehicle 10 when the vehicle 10 is towing the trailer 30 and when the camera module 14 is mounted to the surface 42 of trailer 30.

The examples described above include a single camera module 14 having a single camera 50. Other examples could include camera modules with more than one camera, additional camera modules, or both.

Features of the disclosed examples can include a camera module that adapts to different sizes of trailers to provide relatively unobstructed views to a user.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A viewing method, comprising:
   using a camera module to view a first area when the camera module is at least partially housed within a portion of a vehicle in a first position;
   using the camera module to view a different, second area after moving the camera module to a second position where the camera module is mounted to a structure other than the vehicle; and
   opening at least one door of the camera module when moving the camera module to the first position, the opening permitting a connector of the vehicle to engage a connector of the camera module.

2. The viewing method of claim 1, wherein the portion of the vehicle is a tailgate and the structure other than the vehicle is a trailer.

3. The viewing method of claim 1, further comprising viewing the first area and the second area on a display.

4. The viewing method of claim 1, further comprising wirelessly communicating between the vehicle and the camera module when the camera module is in the second position.

5. The viewing method of claim 1, further comprising transmitting an alert when the camera module is moved from the vehicle a distance that is more than a threshold distance.

6. The viewing method of claim 1, further comprising charging a battery of the camera module when the camera module is in the first position, and powering the camera module using the battery when the camera module is in the second position.

7. The viewing method of claim 6, wherein the charging is an inductive charging.

8. The viewing method of claim 1, further comprising locking the camera module in the first position, and authorizing an unlocking prior to permitting the unlocking.

\* \* \* \* \*